United States Patent
Muthyala et al.

(10) Patent No.: US 12,141,873 B2
(45) Date of Patent: Nov. 12, 2024

(54) DEEP NEURAL NETWORK ASSISTED PREDICTION USING MONTE CARLO SIMULATIONS

(71) Applicant: S&P Global Inc., New York, NY (US)

(72) Inventors: Sunilkumar Muthyala, Hyderabad (IN); Sreedhar Athikam, Monroe Township, NJ (US)

(73) Assignee: S&P Global Inc., New York, NY (US)

( * ) Notice: Subject to any disclaimer, the term of this patent is extended or adjusted under 35 U.S.C. 154(b) by 82 days.

(21) Appl. No.: 18/181,768

(22) Filed: Mar. 10, 2023

(65) Prior Publication Data

US 2024/0303741 A1    Sep. 12, 2024

(51) Int. Cl.
*G06Q 40/06* (2012.01)

(52) U.S. Cl.
CPC .................... *G06Q 40/06* (2013.01)

(58) Field of Classification Search
USPC .......................................................... 705/36
See application file for complete search history.

(56) References Cited

U.S. PATENT DOCUMENTS

| | | | | |
|---|---|---|---|---|
| 6,047,221 A * | 4/2000 | Piche et al. ............ | G05B 13/02 |
| | | | 700/44 |
| 7,236,953 B1 * | 6/2007 | Cooper et al. ......... | G06Q 40/04 |
| | | | 705/36 |
| 11,176,495 B1 * | 11/2021 | Ron et al. ............... | G06N 20/20 |
| 2006/0074501 A1 * | 4/2006 | Hartman et al. ....... | G05B 13/02 |
| | | | 700/29 |
| 2015/0310343 A1 * | 10/2015 | Netz et al. ............. | G06N 5/048 |
| 2015/0339771 A1 * | 11/2015 | Sylvester ............... | G06Q 40/04 |
| 2016/0103559 A1 * | 4/2016 | Maheshwari et al. ....... | |
| | | | G06F 3/0481 |
| 2022/0092697 A1 * | 3/2022 | Ma et al. ............... | G06Q 40/06 |
| 2022/0269936 A1 * | 8/2022 | Zhu et al. ............... | G06N 3/08 |
| 2022/0383152 A1 * | 12/2022 | Kallur Palli Kumar ..... | |
| | | | G06N 5/04 |
| 2023/0237329 A1 * | 7/2023 | Krishan .................. | G06N 3/08 |

(Continued)

FOREIGN PATENT DOCUMENTS

CN    115131170 A  *  9/2022    ............. G06N 3/049

OTHER PUBLICATIONS

Mehtab et al., A Time Series Analysis-Based Stock Price Prediction Using Machine Learning and Deep Learning Models, Apr. 17, 2020, International Journal of Business Forecasting and Marketing Intelligence (IJBFMI), vol. 6, No. 4, pp. 272-335. (Year: 2020).*

(Continued)

*Primary Examiner* — Scott C Anderson
*Assistant Examiner* — George N. Proios
(74) *Attorney, Agent, or Firm* — Yee & Associates, P.C.

(57) ABSTRACT

Testing prototype indices is provided. The method comprises receiving input of a number of historical index values and performing a number of Monte Carlo simulations based on the historical index values to predict future index values. A number of attributes of the historical index values are calculated, and the Monte Carlo simulations are correlated with the attributes to identify a filtered subset of predicted future index values having an accuracy above a defined threshold. The filtered subset of predicted future index values are fed into a deep neural network (DNN) that outputs a confidence score for each of the filtered subset of predictive future index values.

24 Claims, 7 Drawing Sheets

(56) References Cited

U.S. PATENT DOCUMENTS

2024/0144372 A1* 5/2024 Wu et al. ............... G06Q 40/06

OTHER PUBLICATIONS

Shen et al., Short-term stock market price trend prediction using a comprehensive deep learning system, Aug. 28, 2020, Journal of Big Data, 7(1), 66. (Year: 2020).*

* cited by examiner

DEEP NEURAL NETWORK ASSISTED PREDICTION USING MONTE CARLO SIMULATIONS

BACKGROUND INFORMATION

1. Field

The present disclosure relates generally to an improved computing system, and more specifically to a method of using machine learning to evaluate Monte Carlo predictions based on historical data.

2. Background

Current methods for testing the accuracy of prototype indices are based on backtesting of prototype index. Such back testing lacks the ability to properly evaluate the predictive ability of a prototype index.

Therefore, it would be desirable to have a method and apparatus that take into account at least some of the issues discussed above, as well as other possible issues.

SUMMARY

An illustrative embodiment provides a computer-implemented method for testing prototype indices. The method comprises receiving input of a number of historical index values and performing a number of Monte Carlo simulations based on the historical index values to predict future index values. A number of attributes of the historical index values are calculated, and the Monte Carlo simulations are correlated with the attributes to identify a filtered subset of predicted future index values having an accuracy above a defined threshold. The filtered subset of predicted future index values are fed into a deep neural network (DNN) that outputs a confidence score for each of the filtered subset of predictive future index values.

Another embodiment provides a system for testing prototype indices. The system comprises a storage device that stores program instructions and one or more processors operably connected to the storage device and configured to execute the program instructions to cause the system to: receive input of a number of historical index values; perform a number of Monte Carlo simulations based on the historical index values to predict future index values; calculate a number of attributes of the historical index values; correlate the Monte Carlo simulations with the attributes to identify a filtered subset of predicted future index values having an accuracy above a defined threshold; feed the filtered subset of predicted future index values into a deep neural network (DNN); and output, by the DNN, a confidence score for each of the filtered subset of predictive future index values.

Another embodiment provides a computer program product for testing prototype indices. The computer program product comprises a computer-readable storage medium having program instructions embodied thereon to perform the steps of: receiving input of a number of historical index values; performing a number of Monte Carlo simulations based on the historical index values to predict future index values; calculating a number of attributes of the historical index values; correlating the Monte Carlo simulations with the attributes to identify a filtered subset of predicted future index values having an accuracy above a defined threshold; feeding the filtered subset of predicted future index values into a deep neural network (DNN); and outputting, by the DNN, a confidence score for each of the filtered subset of predictive future index values.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that current methods for testing the accuracy of prototype indices is based on backtesting of prototype index. Backtesting builds predictive models based on historical data and employs retrodiction (predicting the past) and cross-validation with previous time periods.

The illustrative embodiments recognize and take into account that backtesting lacks the ability to properly evaluate the predictive ability of a prototype index going forward. Forward testing of a prototype index is missing from evaluations conducted by research and development teams in developing prototype indices.

The illustrative embodiments provide a method of generating simulations to project forward future values and apply machine learning techniques to select the best possible representation of future values. The illustrative embodiment provide the ability to forward test predictive models in contrast to back testing models.

Figure 1:
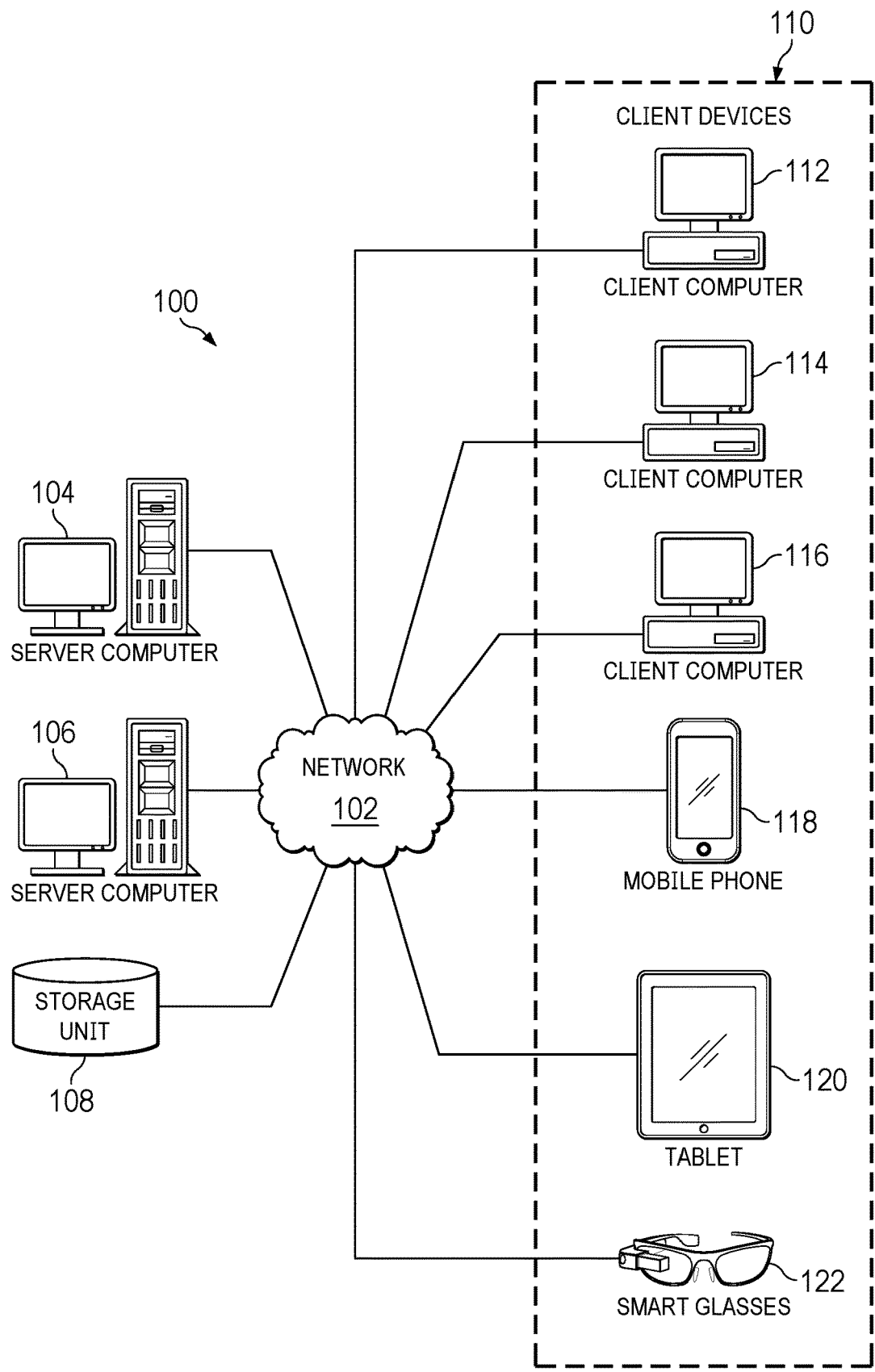
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
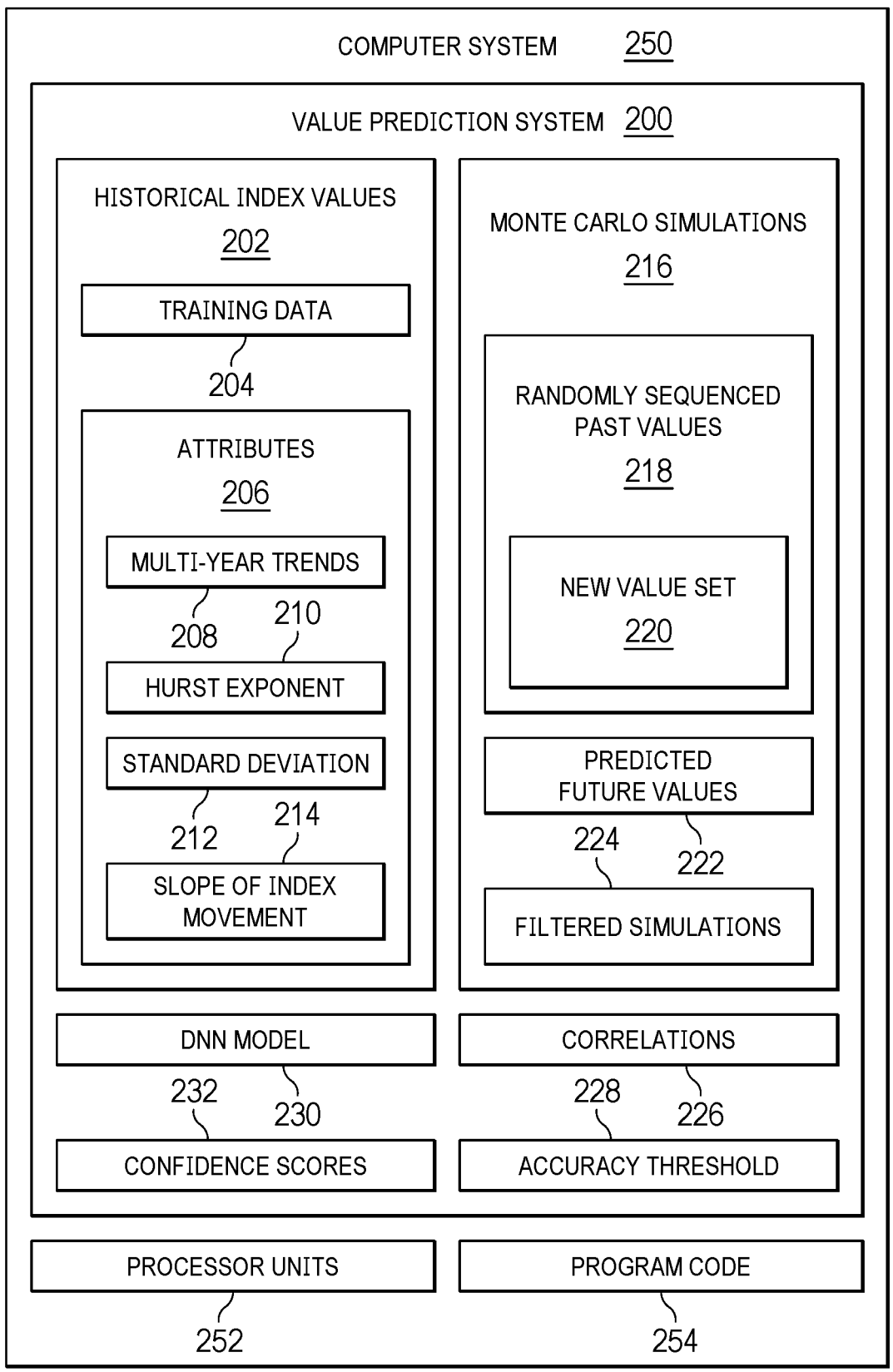
FIG. 2 is a block diagram of a value prediction system depicted in accordance with an illustrative embodiment.

FIG. 2 is a block diagram of a value prediction system depicted in accordance with an illustrative embodiment. Value prediction system 200 might be implemented in network data processing system 100 in FIG. 1.

Value prediction system 200 comprises historical index values 202. A subset of historical index values 202 are used as training data 204 for a deep neural network (DNN) model 230.

Value prediction system 200 generates a number of attributes 206 from historical index values 202. These attributes 206 may include multi-year trends 208, Hurst exponent 210, standard deviation 212, and slope of the index movement 214.

Value prediction system 200 generates a number of Monte Carlo simulations 216. Monte Carlo simulations 216 are based on randomly sequenced past values 218 drawn from historical index values 202, which form a new value set 220. The Monte Carlo simulations 216 use the new value set 220 to forward project predicted future values 222 based on the preceding historical values.

Value prediction system 200 evaluates correlations 226 between Monte Carlo simulations 216 and historical index values 202. A subset of Monte Carlo simulations 216 that meet an accuracy threshold 228 are selected as filtered simulations 224. Accuracy threshold might specify a top N number of Monte Carlo simulations 216 as filtered simulations 224.

DNN model 230 evaluates the filtered simulations 224 and calculates confidence scores 232 for predictions generated by the filtered simulations 224.

Value prediction system 200 can be implemented in software, hardware, firmware, or a combination thereof. When software is used, the operations performed by value prediction system 200 can be implemented in program code configured to run on hardware, such as a processor unit. When firmware is used, the operations performed by value prediction system 200 can be implemented in program code and data and stored in persistent memory to run on a processor unit. When hardware is employed, the hardware can include circuits that operate to perform the operations in value prediction system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
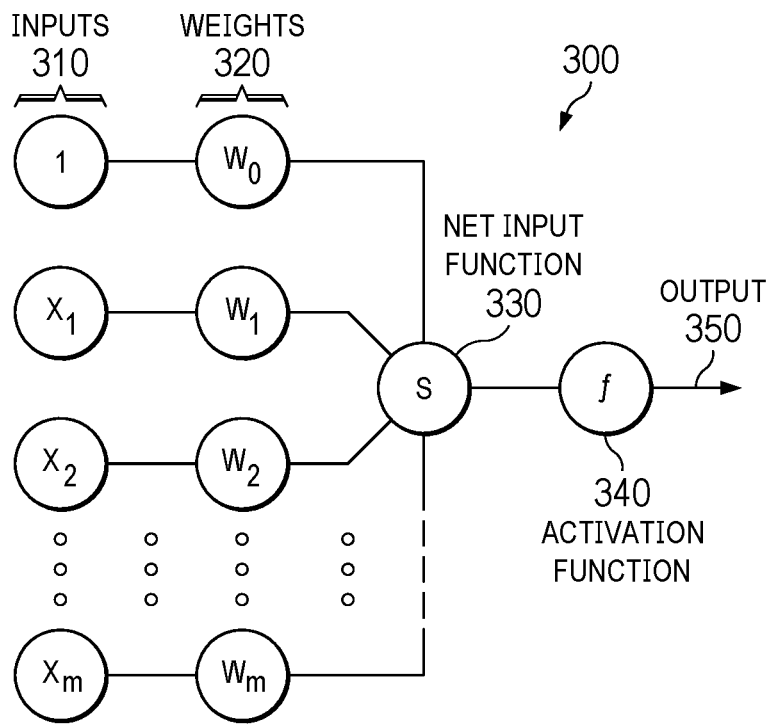
FIG. 3 depicts a diagram illustrating a node in a neural network in which illustrative embodiments can be implemented.

FIG. 3 depicts a diagram illustrating a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
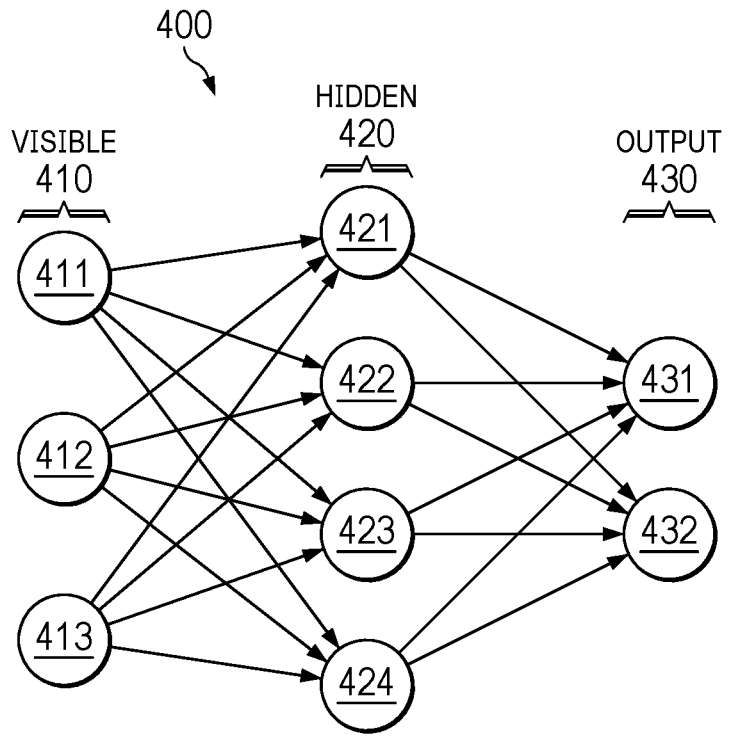
FIG. 4 depicts a diagram illustrating a neural network in which illustrative embodiments can be implemented.

FIG. 4 depicts a diagram illustrating a neural network in which illustrative embodiments can be implemented. As shown in FIG. 4, the nodes in the neural network 400 are divided into a layer of visible nodes 410, a layer of hidden nodes 420, and a layer of output nodes 430. The nodes in these layers might comprise nodes such as node 300 in FIG. 3. The visible layer 410 are those that receive information from the environment (i.e., a set of external training data). Each visible node in visible layer 410 takes a low-level feature from an item in the dataset and passes it to the hidden nodes in the hidden layer 420. When a node in the hidden layer 420 receives an input value x from a visible node in visible layer 410 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 421 in hidden layer 420 receives input from all of the visible nodes 411, 412, and 413 in visible layer 410. Each input value x from the separate nodes 411-413 is multiplied by its respective weight, and all of the products are summed. The summed products are then added to the hidden layer bias, which is a constant value that is added to the weighted sum to shift the result of the activation function and thereby provide flexibility and prevent overfitting the dataset. The result is passed through the activation function to produce output to output nodes 431 and 432 in output layer 430. A similar process is repeated at hidden nodes 422, 423, and 424. In the case of a deeper neural network, the outputs of hidden layer 420 serve as inputs to the next hidden layer.

Neural network layers can be stacked to create deep networks. After training one neural net, the activities of its hidden nodes can be used as inputs for a higher level, thereby allowing stacking of neural network layers. Such stacking makes it possible to efficiently train several layers of hidden nodes. Examples of stacked networks include deep neural networks (DNN), convolutional neural networks (CNN), and recurrent neural networks (RNN).

A recurrent neural network (RNN) is a type of deep neural network in which the nodes are formed along a temporal sequence. RNNs exhibit temporal dynamic behavior, meaning they model behavior that varies over time.

Figure 5:
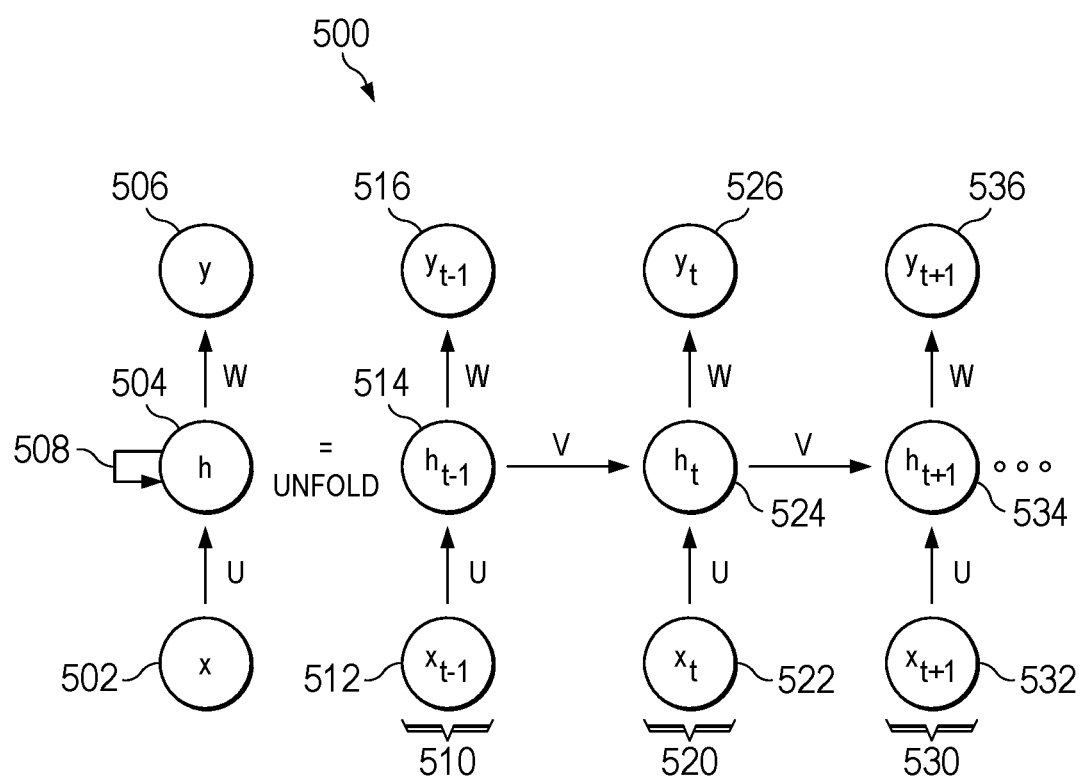
FIG. 5 illustrates an example of a recurrent neural network in which illustrative embodiments can be implemented.

FIG. 5 illustrates an example of a recurrent neural network in which illustrative embodiments can be implemented. RNN 500 might comprise part of machine intelligence 204 in FIG. 2. RNNs are recurrent because they perform the same task for every element of a sequence, with the output being depended on the previous computations. RNNs can be thought of as multiple copies of the same network, in which each copy passes a message to a successor. Whereas traditional neural networks process inputs independently, starting from scratch with each new input, RNNs persistence information from a previous input that informs processing of the next input in a sequence.

RNN 500 comprises an input vector 502, a hidden layer 504, and an output vector 506. RNN 500 also comprises loop 508 that allows information to persist from one input vector to the next. RNN 500 can be "unfolded" (or "unrolled") into a chain of layers, e.g., 510, 520, 530 to write out the network 500 for a complete sequence. Unlike a traditional neural network, which uses different weights at each layer, RNN 500 shares the same weights U, W, V across all steps. By providing the same weights and biases to all the layers 510, 520, 530, RNN 500 converts the independent activations into dependent activations.

The input vector 512 at time step t−1 is $x_{t-1}$. The hidden state $h_{t-1}$ 514 at time step t−1, which is required to calculate the first hidden state, is typically initialized to all zeroes. The output vector 516 at time step t−1 is $y_{t-1}$. Because of persistence in the network, at the next time step t, the state $h_t$ of the hidden layer 524 is calculated based on the previous hidden state $h_{t-1}$ 514 and the new input vector $x_t$ 522. The hidden state $h_t$ acts as the "memory" of the network. Therefore, output $y_t$ 526 at time step t depends on the calculation at time step t−1. Similarly, output $y_{t+1}$ 536 at time step t+1 depends on hidden state $h_{t+1}$ 534, calculated from hidden state $h_t$ 524 and input vector $x_{t+1}$ 532.

There are several variants of RNNs such as "vanilla" RNNs, Long Short-Term Memory (LSTM), Gated Recurrent Unit (GRU), and others with which the illustrative embodiments can be implemented.

Figure 6:
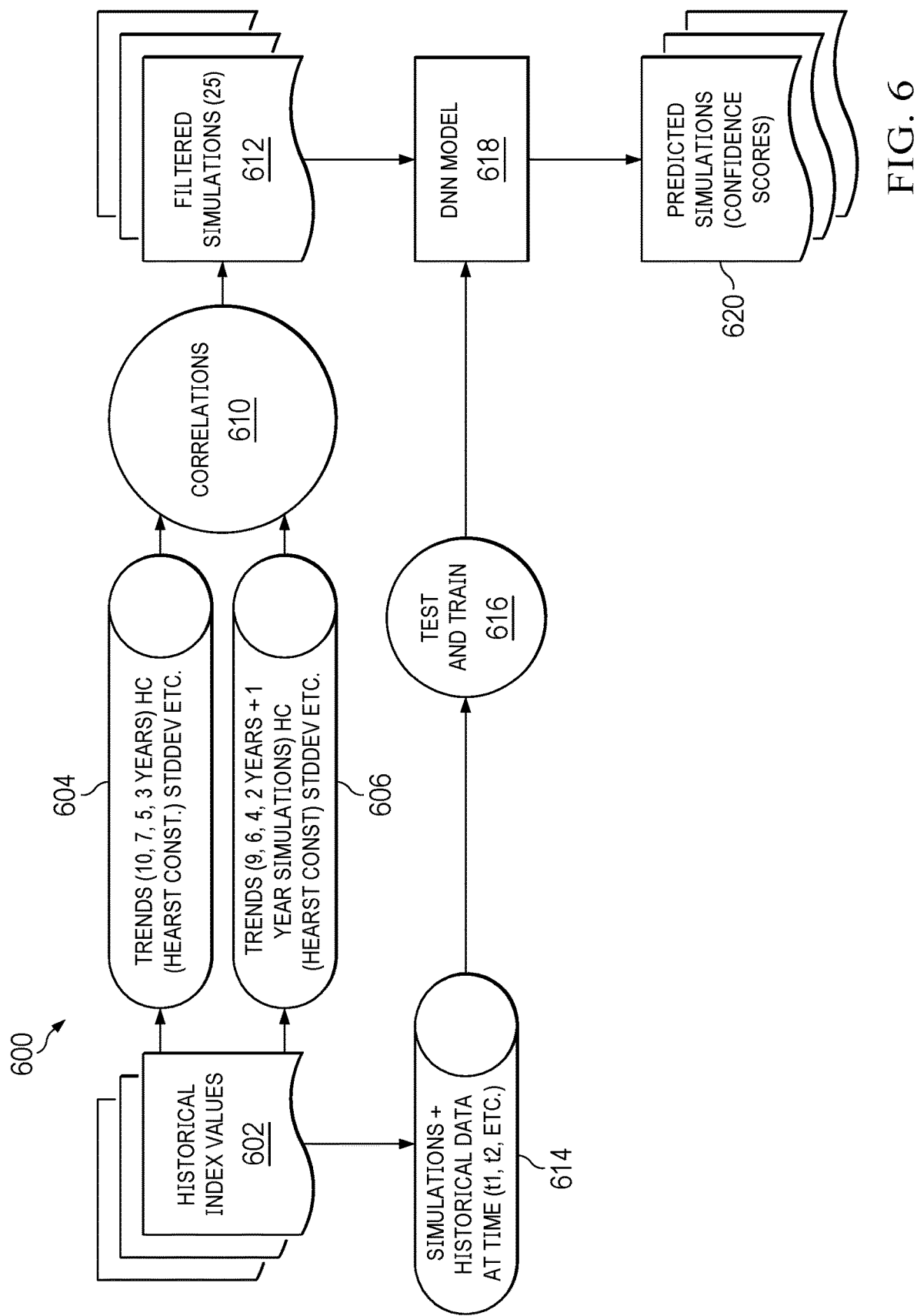
FIG. 6 depicts a block diagram illustrating training a neural network to predict future valuations in accordance with an illustrative embodiment.

FIG. 6 depicts a block diagram illustrating training a neural network to predict future valuations in accordance with an illustrative embodiment. Process 600 can be implemented in value prediction system 200 in FIG. 2.

Process 600 utilizes historical index values 602 to train a deep neural network (DNN) model 618. Historical index values may comprise many years of data points (prices), e.g., 10-15 years. Process 600 uses the historical index values to establish trends over different specified time frames such as, e.g., 10 years, 7 years, 5 years, 3 years. Process 600 calculates several other attributes of the historical index values 602 such as Hurst exponent, standard deviation, and slope of the index movement.

The Hurst exponent, for example, is related to the fractal exponent of a price time series. Market structures are fractal in shape a structure, meaning they have a pattern in which the shape of the parts resemble the whole no matter at what scale they are viewed, i.e., zooming in closer and closer still reveals the same shape. A classic example of a fractal pattern is the Mandelbrot set. Therefore, the same patterns appear on all time frames. The Hurst component provides a way to measure the amount by which a financial time series deviated from a random walk (i.e., a succession of random steps). For example, a Hurst exponent of less than 0.5 indicates that prices in the time series are reverting to the mean. A Hurst exponent equal to 0.5 indicates that the prices in a time series are following a random walk, also known as geometric Brownian motion (GBM). A Hurst exponent greater than 0.5 indicates that the prices in the time series are in fact trending.

Process 600 takes historical index values 602 and performs a number of Monte Carlo simulations 614 across multiple data points, e.g., every year, six months, quarter, month, etc. Monte Carlo simulations comprise computational models that use random sampling of data to calculate expected numerical values. Each Monte Carlo simulation comprises a list of values constructed by randomly picking the return values from the historical index values 602. As a result, the future trends of each Monte Carlo simulation are different.

The Monte Carlo simulations generate predicted values on rolled forward time windows based on the historical index values 602. The rolled forward time windows move a historical time frame up one time increment and add a predicted value for the future at the end of the sequence of values. Thus, the rolled forward time windows effectively drop the first historical index value (of a given time unit, e.g., year, month, etc.) from the original sequence of values to generate a new sequence of values covering the same total amount of time. For example, the historical index values 602 might cover a ten year period. From this data, trends for 10 year, 7 years, 5 years, and 3 years are calculated. A rolled forward time window covering the same total length of time would comprise trends for 9 years, 6 years, 4, years, and 2 years based on the historical index values 602 plus a 1 year trend predicted by the Monte Carlo simulations 614. In this manner, the Monte Carlo simulation takes a "running start" at the predicted value for the new time interval based on the values immediately preceding it. The same simulation process can be applied at other time scales such as multi-month trends, multi-week trends, etc.

During training and testing 616, the predictions generated by the Monte Carlo simulations are compared to the historical trends for accuracy and correlations. Using the example above, the trends (e.g., 10, 7, 5, and 3 year) of the historical index values are compared with the trends of the rolled forward time window including each of the Monte Carlo simulations as the last year trend. From this comparison, the DNN model 618 can learn the correlations that exist between the most accurate Monte Carlo simulations and the historical training data.

In an embodiment, a sequential recurrent neural network (RNN) can be used for DNN model 618. As explained above, RNNs are useful for computation that depend on previous computations, such as prices in a time series.

Currently, several thousand financial indices exist that can be studied. New prototype indices based on the historical index values can be created and forward projections run to train and test a DNN model. Each index has its own DNN model.

After DNN model 618 is trained, it can be used to evaluate new Monte Carlo simulation models 606. Different simulations have different up and down trends of the index value on a daily basis. Having a number of simulations ensures the process accounts for market movements under different conditions. These new Monte Carlo simulations can be based on the remaining data in historical index values 602 not used during training and testing 616 of the DNN model 618. The new Monte Carlo simulations 606 are compared to the actual historical trend 604, and their correlations 610 are evaluated. Perhaps 30-40 attributes may be evaluated in determining the correlations 610.

Correlations 610 are used to filter the most accurate Monte Carlo simulations 606. These filtered simulations 612 may comprise, for example, the top N (e.g., 25) most accurate Monte Carlo simulations.

The trained DNN model 618 evaluates the filtered simulations 612 and assigns confidence scores 620 to the predicted simulations (values) generated by the filtered simulations 612.

Figure 7:
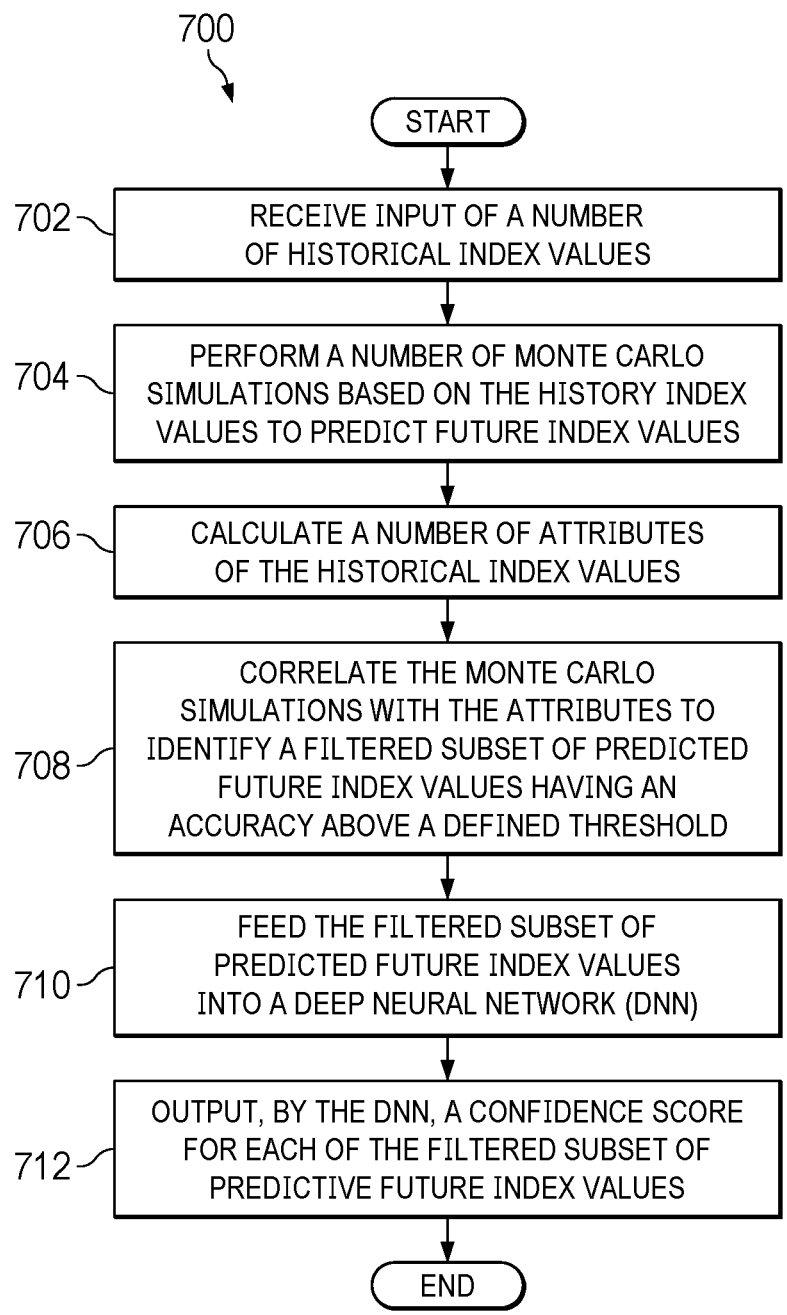
FIG. 7 depicts a flowchart illustrating a process for testing prototype indices in accordance with an illustrative embodiment.

FIG. 7 depicts a flowchart illustrating a process for testing prototype indices in accordance with an illustrative embodiment. Process 700 might be implemented in value prediction system 200 in FIG. 2.

Process 700 beings by receiving input of a number of historical index values (step 702). Process 700 then performs a number of Monte Carlo simulations on the history index values to predict future index values (step 704). The future index values predicted by the Monte Carlo simulations are added to a rolled forward time window based on the historical index values. The different Monte Carlo simulations predict different future trends.

A number of attributes of the historical index values are calculated (step 706). The attributes of the historical index values might comprise at least one of multi-year trends, Hearst exponent, standard deviation, or the slope of index movement.

The Monte Carlo simulations are then correlated with the attributes to identify a filtered subset of predicted future index values having an accuracy above a defined threshold (step 708). The filtered subset of predicted future index values might comprise the top N most accurate of the Monte Carlo simulations.

Process 700 feeds the filtered subset of predicted future index values are fed into a deep neural network (DNN) (step 710). The DNN can be trained with simulations of a second set of historical index values. The DNN may comprise a sequential recurrent neural network.

The DNN outputs a confidence score for each of the filtered subset of predictive future index values (step 712).

Process 700 then ends.

Figure 8:
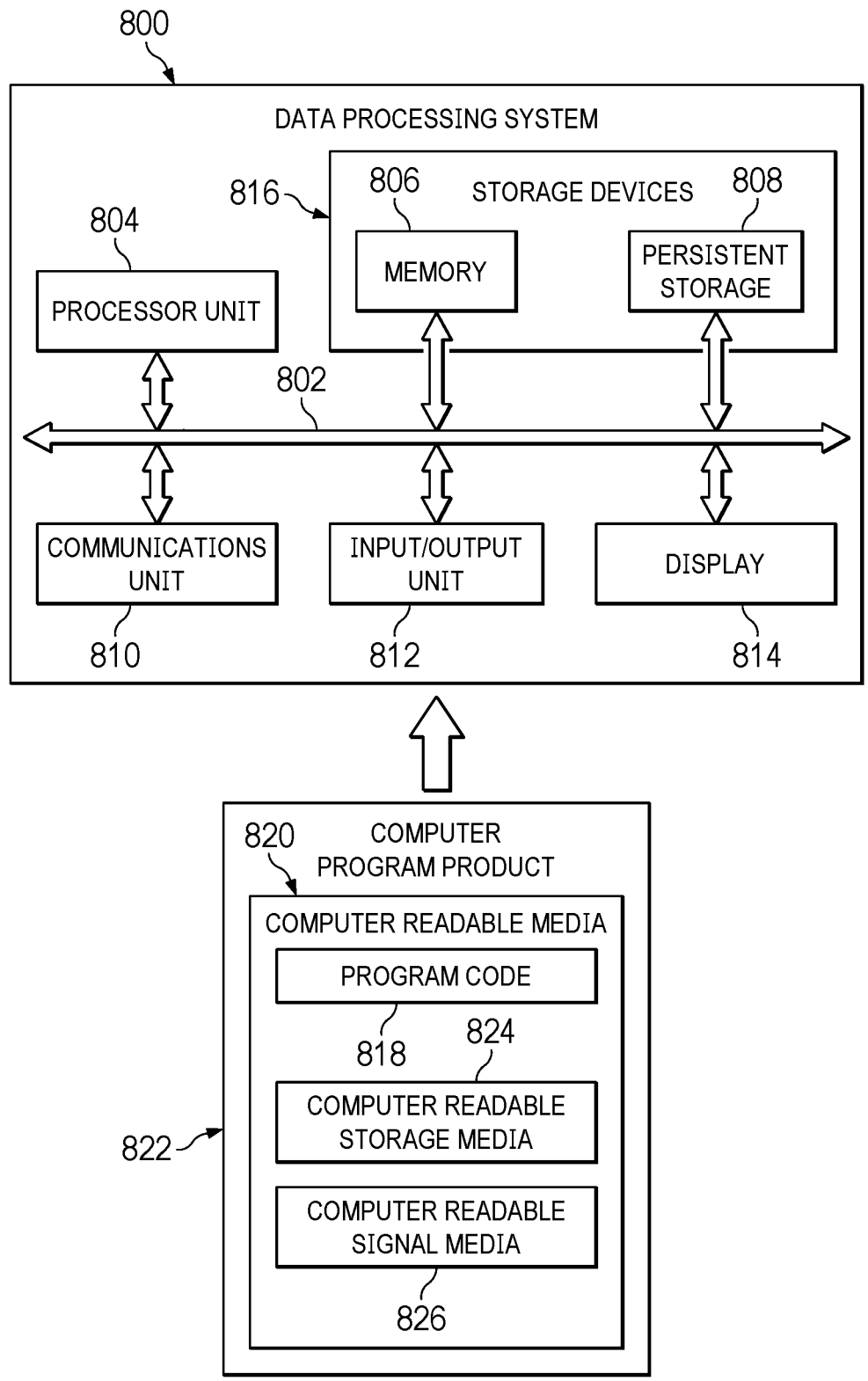
FIG. 8 is a block diagram of a data processing system in accordance with an illustrative embodiment.

Turning now to FIG. 8, an illustration of a block diagram of a data processing system is depicted in accordance with an illustrative embodiment. Data processing system 800 may be used to implement server computers 104 and 106 and client devices 110 in FIG. 1, as well as computer system 250 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general-purpose central processing units (CPUs). In an alternate embodiment, processor unit 804 comprises one or more graphical processing units (GPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808. Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Computer readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 818 may be transferred to data processing system 800 using computer-readable signal media 826. Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for testing prototype indices, the method comprising:
   using a number of processors to perform the steps of:
      receiving input of a number of historical index values;
      performing a number of Monte Carlo simulations based on the historical index values to predict future index values;
      calculating a number of attributes of the historical index values;
      correlating the Monte Carlo simulations with the attributes to identify a filtered subset of predicted future index values having an accuracy above a defined threshold;
      feeding the filtered subset of predicted future index values into a deep neural network (DNN), wherein the deep neural network comprises a sequential recurrent neural network; and
      outputting, by the DNN, a confidence score for each of the filtered subset of predictive future index values.

2. The method of claim 1, wherein the attributes of the historical index values comprise at least one of:
   multi-year trends;
   Hearst exponent;
   standard deviation; or
   slope of index movement.

3. The method of claim 2, wherein the multi-year trends comprise at least one of:
   3 years;
   5 years;
   7 years; or
   10 years.

4. The method of claim 1, wherein the DNN is trained with simulations of a second set of historical index values.

5. The method of claim 1, wherein the number of Monte Carlo simulations are based on randomly sequenced past values drawn from the number of historical index values.

6. The method of claim 1, wherein the future index values predicted by the Monte Carlo simulations are added to a rolled forward time window based on the historical index values.

7. The method of claim 1, wherein the Monte Carlo simulations predict different future trends.

8. The method of claim 1, wherein the filtered subset of predicted future index values comprises a top N most accurate of the Monte Carlo simulations.

9. A system for testing prototype indices, the system comprising:
   a storage device that stores program instructions;
   one or more processors operably connected to the storage device and configured to execute the program instructions to cause the system to:
      receive input of a number of historical index values;
      perform a number of Monte Carlo simulations based on the historical index values to predict future index values;
      calculate a number of attributes of the historical index values;
      correlate the Monte Carlo simulations with the attributes to identify a filtered subset of predicted future index values having an accuracy above a defined threshold;
      feed the filtered subset of predicted future index values into a deep neural network (DNN)), wherein the deep neural network comprises a sequential recurrent neural network; and
      output, by the DNN, a confidence score for each of the filtered subset of predictive future index values.

10. The system of claim 9, wherein the attributes of the historical index values comprise at least one of:
    multi-year trends;
    Hearst exponent;
    standard deviation; or
    slope of index movement.

11. The system of claim 10, wherein the multi-year trends comprise at least one of:
    3 years;
    5 years;
    7 years; or
    10 years.

12. The system of claim 9, wherein the DNN is trained with simulations of a second set of historical index values.

13. The system of claim 9, wherein the number of Monte Carlo simulations are based on randomly sequenced past values drawn from the number of historical index values.

14. The system of claim 9, wherein the future index values predicted by the Monte Carlo simulations are added to a rolled forward time window based on the historical index values.

15. The system of claim 9, wherein the Monte Carlo simulations predict different future trends.

16. The system of claim 9, wherein the filtered subset of predicted future index values comprises a top N most accurate of the Monte Carlo simulations.

17. A computer program product for testing prototype indices, the computer program product comprising:
    a computer-readable storage medium having program instructions embodied thereon to perform the steps of:
       receiving input of a number of historical index values;
       performing a number of Monte Carlo simulations based on the historical index values to predict future index values;
       calculating a number of attributes of the historical index values;
       correlating the Monte Carlo simulations with the attributes to identify a filtered subset of predicted future index values having an accuracy above a defined threshold;

feeding the filtered subset of predicted future index values into a deep neural network (DNN), wherein the deep neural network comprises a sequential recurrent neural network; and outputting, by the DNN, a confidence score for each of the filtered subset of predictive future index values.

18. The computer program product of claim 17, wherein the attributes of the historical index values comprise at least one of:

multi-year trends;
Hearst exponent;
standard deviation; or
slope of index movement.

19. The computer program product of claim 18, wherein the multi-year trends comprise at least one of:

3 years;
5 years;
7 years; or
10 years.

20. The computer program product of claim 17, wherein the DNN is trained with simulations of a second set of historical index values.

21. The computer program product of claim 17, wherein the number of Monte Carlo simulations are based on randomly sequenced past values drawn from the number of historical index values.

22. The computer program product of claim 17, wherein the future index values predicted by the Monte Carlo simulations are added to a rolled forward time window based on the historical index values.

23. The computer program product of claim 17, wherein the Monte Carlo simulations predict different future trends.

24. The computer program product of claim 17, wherein the filtered subset of predicted future index values comprises a top N most accurate of the Monte Carlo simulations.

* * * * *